UNITED STATES PATENT OFFICE.

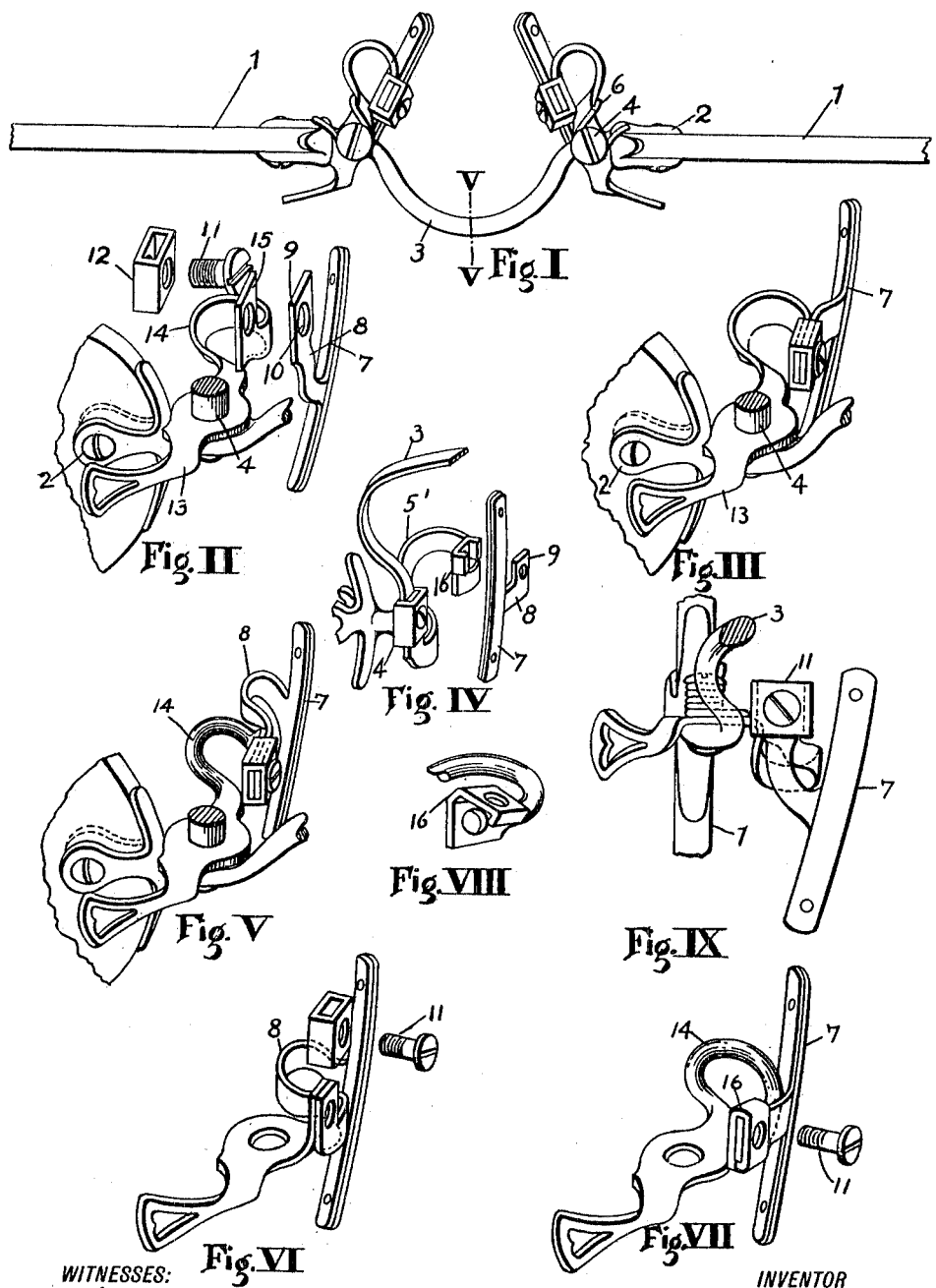

JOEL C. WELLS, OF SOUTHBRIDGE, MASSACHUSETTS.

EYEGLASSES.

1,114,830. Specification of Letters Patent. Patented Oct. 27, 1914.

Application filed March 20, 1912. Serial No. 685,002.

*To all whom it may concern:*

Be it known that I, JOEL C. WELLS, a citizen of the United States, residing at Southbridge, in the county of Worcester and State of Massachusetts, have invented certain new and useful Improvements in Eyeglasses, of which the following is a specification.

My invention relates to improvements in eyeglasses and has for its object the provision of an improved eyeglass mounting equipment with interchangeable guards which will permit of any desired adjustment of the said guards.

The further object of my invention is the provision of an improved eyeglass mounting adapted to have ordinary stud box guards mounted therein and which will be so constructed that the said guards may be adjusted as desired and which will further permit of the utilization of old style stud box guards as well as the present improved type of free front edge guard and which will thus permit of the equipment of the mounting with any desired type of stud box guard and will permit of the same guard being used in the ordinary manner or with a free front edge as may best suit the wearer after experimenting therewith.

Other objects and advantages of my improved finger piece eyeglass mounting will be readily apparent by reference to the following specification taken in connection with the accompanying drawings forming a part thereof, and it will be understood that I may make any modifications in the exact details of construction or position and arrangement of parts within the scope of my claim without departing from or exceeding the spirit of my invention.

Figure I represents a plan view of an eyeglass mounting constructed in accordance with and embodying the principles of my invention. Fig. II represents a perspective view of the various parts in disassembled relation. Fig. III represents a perspective view of a slightly modified construction. Fig. IV represents a view of a construction of my device adapted for use with a stud box spring bridge mounting to enable the use of the guards of said mounting with a free front edge and facilitate adjustment of said guards. Fig. V represents a view of another modified construction adapted to attain maximum adjustability. Fig. VI represents a perspective view of a further modification of my invention. Fig. VII represents another modification in which the stud sleeve is formed integral with the lever. Fig. VIII represents a fragmentary perspective view illustrating the construction of said lever end, and Fig. IX represents a sectional view on the line 5—5 of Fig. I.

In the drawings, in which similar characters of reference are employed throughout to denote corresponding parts, the numeral 1 designates the lenses which are connected by the usual lens supports including the clips 2 and the bridge 3. In most of the forms of my invention I have illustrated the same as applied to a finger piece mounting, but in Fig. IV I have shown the same as employed on an ordinary stud box spring bridge type of eyeglass. In the finger piece structures the bridge has rising therefrom the pivot posts 4 on which are mounted the finger piece levers 13 actuated by the springs 6 encircling the said pivots. In Fig. IV the lens clips 2 have projecting therefrom the stud boxes 4' into which fit the end of the bridge 3 and the tang of the arm 5'.

In the various forms of my invention illustrated I have shown an ordinary stud box guard 7 having an arm 8 terminating in a tang 9 for engaging the adjustable arm of my device, said tang preferably having a perforation 10 formed therein to receive the securing device 11 for attaching the tang 9 to the tang 15 of the adjustable arm. In certain of the views I have shown the tangs 9 and 15 as disposed in a substantially vertical position, while in other forms I have shown the same disposed horizontally, this depending upon the style of guard employed. To connect the two tangs I may either inclose the same by the stud sleeve 12 adapted to slip thereover and be locked in place by the fastener 11, or I may form either an open or closed stud box 16 on the tang 15, said stud box receiving the tang 9 and having the tang secured therewithin by the fastening 11.

To secure the adjustment of the ordinary stud box guards employed in connection with my mounting, I form the arm 5 into a loop 14 which permits of the bending and adjustment of the position of the guard. The said looped portion 14 has been illustrated in certain of the figures as formed from flat material, while in others it is formed from round material, the round material affording a slightly greater amount of adjustability in a vertical plane which is secured in the other instances by somewhat twisting the metal or by bending of the horizontal portion thereof in the finger piece structures.

While in most of the illustrations of my invention I have shown the adjustability of the guard as attained solely by bending or twisting of the loop portion 14 of the finger piece lever, in Figs. V and VI, I have shown the guard arm 8 as looped to provide a gripping free front edge, the adjustment in this case being a double one, since the position of the guard relative to the lenses and the inset or outset of the guard may be regulated primarily by adjustment of the loop 14 and the biting of the free front edge of the guard 7 may then be insured by slightly opening the loop 8, as will be at once apparent to those familiar with eyeglass adjustment.

I claim:

In a mounting of the character described, the combination with a support, of an arm carried thereby and terminating in a perforated upwardly projecting tang, a guard member having an arm extended laterally therefrom, said arm also terminating in a perforated tang, and an angular sleeve closed except at the top and bottom, said sleeve being fitted over the perforated tangs of the guard and of the arm, and holding said parts in close engagement one with the other, said sleeve having a pair of alined perforations formed through the sides thereof, said perforations being adapted to register with the perforations in the two tangs, one of the perforations of the sleeve and the perforations of the two tangs being plain, and the other perforation of the sleeve being slightly smaller and tapped, and a screw fastening device passing loosely through the aforesaid three plain apertures and being engaged in the fourth tapped aperture for securing the parts together, substantially as described.

In testimony whereof I affix my signature in presence of two witnesses.

JOEL C. WELLS.

Witnesses:
  REGINALD H. WATERS,
  ALICE M. HOAR.

---

Copies of this patent may be obtained for five cents each, by addressing the "Commissioner of Patents, Washington, D. C."